(12) United States Patent
Gottwald

(10) Patent No.: US 9,014,566 B2
(45) Date of Patent: Apr. 21, 2015

(54) OPTICAL COMPONENT AND METHOD FOR DATA PROCESSING

(75) Inventor: Erich Gottwald, Holzkirchen (DE)

(73) Assignee: Xieon Networks S.a.r.l., Luxembourg (LU)

( * ) Notice: Subject to any disclaimer, the term of this patent is extended or adjusted under 35 U.S.C. 154(b) by 383 days.

(21) Appl. No.: 13/122,774

(22) PCT Filed: Oct. 6, 2008

(86) PCT No.: PCT/EP2008/063320
§ 371 (c)(1),
(2), (4) Date: Jun. 1, 2011

(87) PCT Pub. No.: WO2010/040377
PCT Pub. Date: Apr. 15, 2010

(65) Prior Publication Data
US 2011/0229135 A1  Sep. 22, 2011

(51) Int. Cl.
*H04B 10/00* (2013.01)
*H04B 10/06* (2006.01)
*H04B 10/60* (2013.01)
*H04B 10/40* (2013.01)
*H04B 10/64* (2013.01)
*H04B 10/43* (2013.01)

(52) U.S. Cl.
CPC ............... *H04B 10/60* (2013.01); *H04B 10/43* (2013.01); *H04B 10/40* (2013.01); *H04B 10/64* (2013.01)

(58) Field of Classification Search
None
See application file for complete search history.

(56) References Cited

U.S. PATENT DOCUMENTS

| 4,703,474 A | * | 10/1987 | Foschini et al. | 370/441 |
| 5,228,043 A | | 7/1993 | Naito et al. | |
| 5,245,459 A | * | 9/1993 | Faulkner et al. | 398/67 |
| 5,274,490 A | | 12/1993 | Tsushima et al. | |
| 7,636,525 B1 | * | 12/2009 | Bontu et al. | 398/208 |
| 2007/0154221 A1 | * | 7/2007 | McNicol et al. | 398/135 |
| 2008/0298417 A1 | * | 12/2008 | Atkins et al. | 372/50.22 |

FOREIGN PATENT DOCUMENTS

EP  0 467 266 A2  1/1992

OTHER PUBLICATIONS

Ito F: "Interferometric demultiplexing experiment using linear coherent correlation with modulated local oscillator" Electronics Letters, IEE Stevenage, GB, vol. 32, No. 1, Jan. 4, 1996, pp. 14-15, XP006004567 ISSN: 0013-5194.
Norimatsu S et al: "10 Gbit/s optical BPSK homodyne detection experiment with solitary DFB laser diodes" Electronics Letters, IEE Stevenage, GB, vol. 31, No. 2, Jan. 19, 1995, pp. 125-127, XP006002325 ISSN: 0013-5194.

* cited by examiner

*Primary Examiner* — Darren E Wolf
(74) *Attorney, Agent, or Firm* — Nelson Mullins Riley & Scarborough LLP

(57) ABSTRACT

An optical component contains a tunable laser. The tunable laser provides an optical local oscillator signal, and the tunable laser is directly modulated to provide a modulated optical data signal. In this manner we have optimization of the channel wavelength and obtain an optimized electrical and optical bandwidth utilization. Furthermore, a method for data processing is suggested.

13 Claims, 3 Drawing Sheets

OPTICAL COMPONENT AND METHOD FOR DATA PROCESSING

The invention relates to an optical component and to a method for data processing.

BACKGROUND OF THE INVENTION

Field of the Invention

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

The PON has been standardized for FTTH solutions and it is currently being deployed by network service providers world-wide. Conventional PONs distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

Upstream signals can be combined using a multiple access protocol, i.e. invariably time division multiple access (TDMA). The OLTs "range" the ONUs to provide time slot assignments for upstream communication. Hence, the data rate is distributed among several subscribers, whereas the single ONU needs to be capable of handling data rates that are significantly higher than the average data rate utilized by such ONU.

Future traffic is assessed for a majority of subscribers to amount to about 1 Gb/s. Thus, flexible and cost effective PONs and/or optical access networks (OANs) are required to meet such a requirement.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers around 1550 nm. Dense WDM uses the same transmission window but with denser channel spacing. Channel plans vary, but a typical system may use 40 channels at 100 GHz spacing or 80 channels with 50 GHz spacing. Some technologies are capable of 25 GHz spacing. Amplification options (Raman amplification) enable the extension of the usable wavelengths to the L-band, more or less doubling these numbers.

Optical access networks, e.g., a coherent Ultra-Dense Wave-length Division Multiplex (UDWDM) network, are deemed to be the future data access technology.

A state of the art mixture of WDM and TDM techniques requires burst mode handling, which leads to severe problems regarding receiver design in particular for high data rates. In addition, a complex time slot management is required and the ONUs need to be equipped to handle much higher data rates than average.

BRIEF SUMMARY OF THE INVENTION

Hence, it is an objective of this approach to overcome the disadvantages described and in particular to optimize coherent heterodyne receivers together with a channel wavelength plan in order to reach an improved or optimized electrical and optical bandwidth utilization.

This problem is solved according to the features of the independent claims. Further embodiments result from the depending claims.

In order to overcome this problem, an optical component is provided comprising a tunable laser, wherein the tunable laser provides an optical local oscillator signal, wherein the tunable laser is directly modulated to provide a modulated optical data signal.

The tunable laser may comprise any kind of light source that can be used for conveying information in an optical system or network. The optical component may comprise optical and electrical processing means.

For example, DPSK, DQPSK or FM may be used as modulation techniques.

In an embodiment, the tunable laser in particular comprises an optical local oscillator laser unit with a directly modulated laser (DML) and/or a an optical amplifier, in particular a semiconductor optical amplifier that may amplify and modulate the light of the laser.

Thus, the laser itself and/or the amplifier can be controlled to provide said modulation. In particular, a current applied to the optical amplifier may have an impact on a phase variation thereby enabling said modulation.

In another embodiment, the output of the optical receiver is fed to a processing unit electronically compensating distortions caused by the modulated optical data signal, in particular by said modulation provided by the tunable laser (comprising the optical local oscillator signal).

The distortions caused by the modulation of the optical tunable laser, which serves as transmitter and optical local oscillator, may at least partially be reduced or compensated to allow processing of the received signal without significant deterioration by the modulated optical data signal (said modulation being provided by the tunable laser at the optical component). This can be achieved as the modulation signal of the tunable laser is well known at the optical component and can thus be inverted and fed to, e.g., a voltage controlled oscillator (VCO) or a phase modulator for compensation purposes in the electrical domain.

In a further embodiment, the processing unit comprises an error correction function and controls at least one parameter of the tunable laser based on information provided by said error correction function.

The error correction function may supply an error rate and/or a number of errors corrected that could be used to adjust the tunable laser, e.g., a modulation current driving the laser and/or its amplifier, thereby iteratively or (semi-) continuously reducing the error rate or the number of errors corrected.

Hence, the feedback loop allows repeatedly adjusting the tunable laser in order to minimize the errors produced by the error correction function, which in particular comprises a forward error correction (FEC) functionality.

The FEC information can be determined based on a received signal to adjust a phase and/or frequency shift of the tunable laser.

In a next embodiment, a channel spacing of a frequency amounting to $3\Delta f$ around a frequency of the local oscillator signal is applied, wherein said frequency $\Delta f$ corresponds to a frequency gap separating upstream and downstream signals or/and said frequency $\Delta f$ corresponds to a frequency band used for a single channel.

It is also an embodiment that the frequency Δf corresponds to a frequency in the order of 0.1 GHz to 10 GHz.

Pursuant to another embodiment, the optical component is a or is associated with a transceiver.

According to an embodiment, the optical component is an or is associated with an optical network unit.

According to another embodiment, the optical component is an or is associated with an optical line terminal.

The problem stated above is also solved by a method for data processing
- wherein an optical local oscillator signal is provided by a tunable laser and
- wherein a modulated optical data signal is provided by the tunable laser.

Hence the same tunable laser provides the modulated optical data signal and the LO signal at a single optical component, e.g., a transceiver, in particular associated with an OLT or with an ONU.

The tunable laser may comprise a DML and/or an optical amplifier, e.g., a SOA.

According to an embodiment,
- the modulated optical data signal is combined with a received optical signal;
- the modulated optical signal is at least partially electronically compensated.

In particular, a distortion of the received data signal caused by the modulated signal is at least partially electronically compensated.

The optical component, e.g., transceiver may obtain said "received optical signal" which corresponds, e.g., to user data to be evaluated and further processed at the optical component. The tunable laser provides the LO signal required for processing the received optical signal. However, the tunable laser also provides modulated optical signal to be transmitted from the optical component to another optical component. Such modulated optical signal may interfere with the received optical signal. Thus, the optical component may provide means for compensating the modulated optical signal and to process the received optical signal without impact from the modulated optical signal. Such compensation may advantageously be processed electronically, i.e., after the received optical signal is transferred to the electrical domain.

Hence, the combined signal is processed to compensate the modulated optical signal provided by the tunable laser interfering with the received optical signal. This can be done as the modulated optical signal is well known and could, e.g., be electronically compensated (or at least reduced) by adding an inverse signal processed via, e.g., a voltage controlled oscillator.

In yet another embodiment, the tunable laser is controlled based on an error rate and/or on a number of corrected errors determined in the combined signal comprising the modulated optical data signal and the received optical signal.

According to a next embodiment, the error rate and/or the number of corrected errors is determined by a forward error correction (FEC) function.

Pursuant to yet an embodiment, said method is run on an optical component, in particular a transceiver of a or associated with an optical line terminal or an optical network unit.

The problem stated supra is further solved by a communication system comprising the device as described herein.

Embodiments of the invention are shown and illustrated in the following figures:

DESCRIPTION OF THE INVENTION

Figure 1:
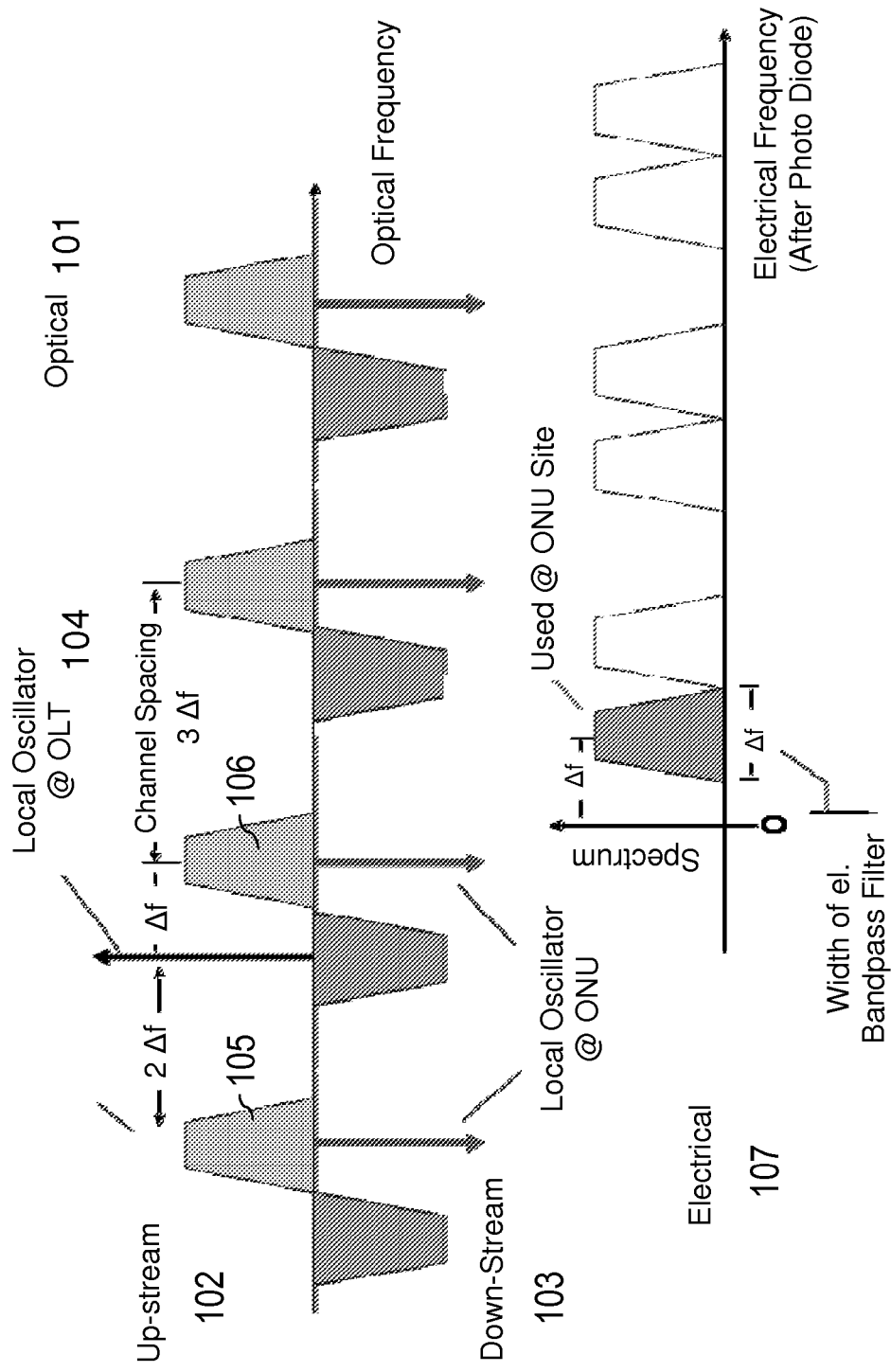
FIG. 1 shows a wavelength/frequency plan for an single fiber UDWDM system with heterodyne detection.

FIG. 1 shows a wavelength/frequency plan for an single fiber UDWDM system with heterodyne detection.

The frequency map comprises an optical representation 101 with an upstream portion 102 and with a downstream portion 103. The upstream portion 102 comprises a local oscillator frequency provided by the OLT, wherein the center of a frequency band 106 is set to Δf and the center of a frequency band 105 is set to −2Δf with regard to the local oscillator frequency 104 or the opposite hand frequency plan. This results in an overall channel spacing of 3Δf for upstream and of 3Δf for downstream signals.

Upstream and downstream signals are typically separated by a frequency gap Δf in the order of 1 GHz to 10 GHz.

The corresponding electrical frequency map 107 (at the receiver after the receiver's photo diode) shows a spacing of Δf and a width Δf of an electrical bandpass filter.

Hence, at the ONU site, a local oscillator (LO) is stabilized to a downstream wavelength with a frequency offset amounting to Δf. The received downstream signal after the photo diode (PD) is combined with an electrical carrier with an intermediate frequency of Δf.

The modulation of the up-stream data is advantageously processed via baseband modulation in order to avoid a significant waste of optical bandwidth.

An advantage of the approach provided is a direct modulation of the laser diode or of an amplifying SOA. This can preferably be done for differential modulation, e.g., DQPSK, DPSK modulation or FM.

The frequency scheme depicted in FIG. 1 avoids mixing two downstream signals at the photodiode. Such mixing would occur, if the frequency of the LO was in the middle between two downstream signals.

At the ONU, an electrical bandpass filter at Δf may select the appropriate channel. At the OLT a single LO is used for detecting a set of upstream channels.

For flexibility reasons of digital processing, a digital receiver concept with fast analog-to-digital converters (ADCs) could be used. With the ONU processing channel data rates in the order of 1 Gbit/s and intermediate frequencies in the order of 1 GHz, the digital receiver can be realized with non-expensive and widely available components.

The OLT, however, needs to cope with multichannel detection and therefore frequencies far beyond 10 GHz are to be processed. For such broad frequency range, digital components are much more expensive than for smaller frequency bands. Thus, the OLT receiver preferably comprises an analog "parallelizing" portion in which intermediate frequencies (IFs) larger than Δf are mixed down to about IF=Δf (according to a "Doppelsuper" principle known from radio technology). Each channel-signal that has been mixed down is further processed in the electrical domain via N output ports, wherein each such output port is connected to a digital receiver compared to the receiver at the ONU. Hence, this parallelization allows utilizing several ADCs with a reduced processing frequency of about 1 GHz, which significantly reduces the overall cost for the OLT and enables the advantages of digital processing.

Figure 2:
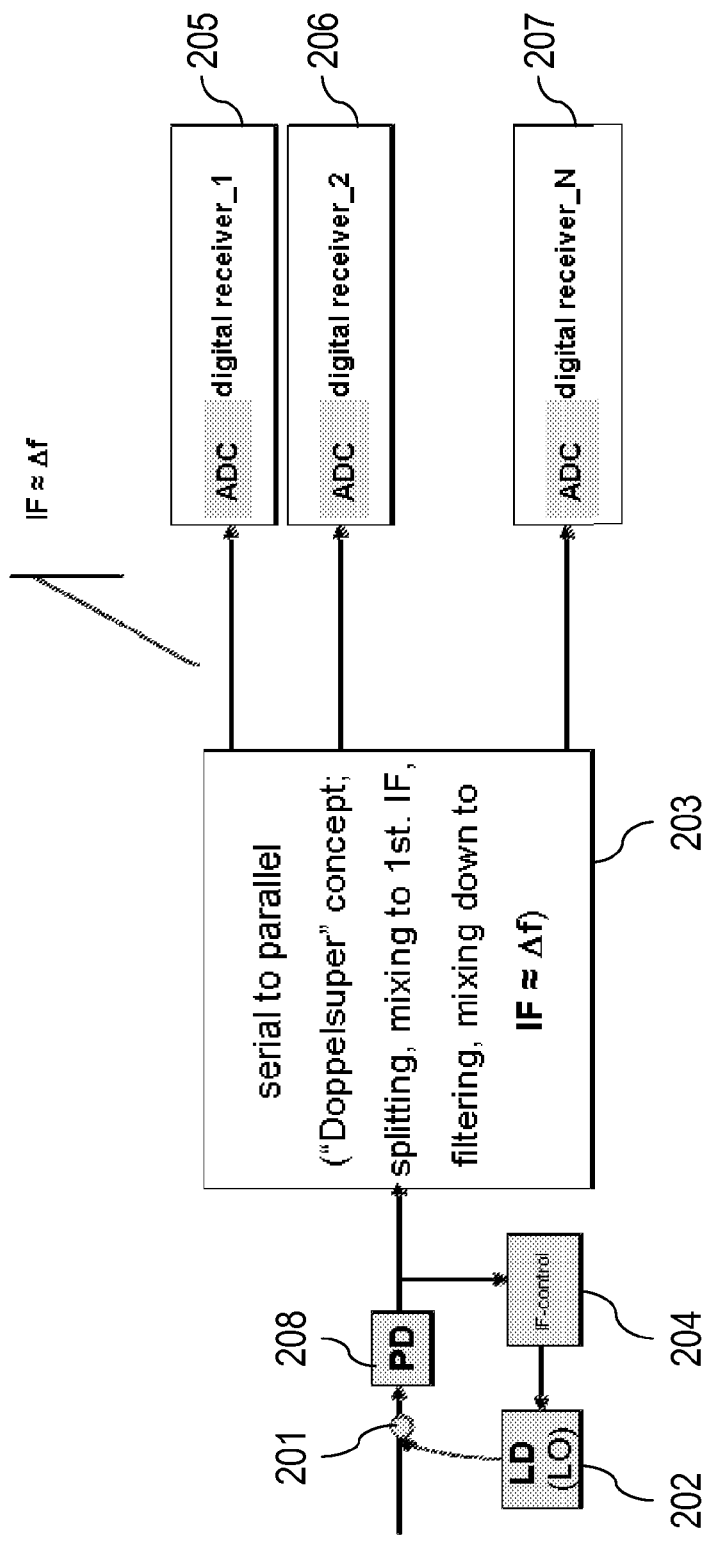
FIG. 2 shows a mixed analog digital concept for multi-channel receivers at an OLT.

FIG. 2 shows a mixed analog/digital concept for multi-channel receivers at the OLT as described above. The signals are received at a coupler 201 to which also an LO signal from a laser diode (LD) is fed. The output of the coupler 201 is connected to a photo diode PD 208, which output is connected to a serial-to-parallel conversion unit 203 and to an IF-control unit 204. The IF-control unit 204 is used to control or adjust the signal of the LD 202.

The serial-to-parallel conversion unit 203 splits the several optical signals and mixes them to the first IF, separates them by filtering and mixes them down to an intermediate frequency in the range of about $\Delta f$. Each signal is fed via parallel ports to separate digital receivers 205 to 207 comprising an ADC operable at a much lower frequency then without said parallelization, thereby allowing fully digital signal processing for each channel-signal.

Transmitter/Receiver Embodiment(s):

It is noted that a receiver may in particular be a polarization diversity based coherent heterodyne receiver. A synchronization may be provided within the electrical domain.

This approach in particular utilizes a directly modulated laser (DML) at the optical component, e.g. at the ONU or at the OLT, being utilized also as optical local oscillator (LO) carrying the upstream signal. Preferably, DPSK, DQPSK or FM can be used as modulation schemes.

Figure 3:
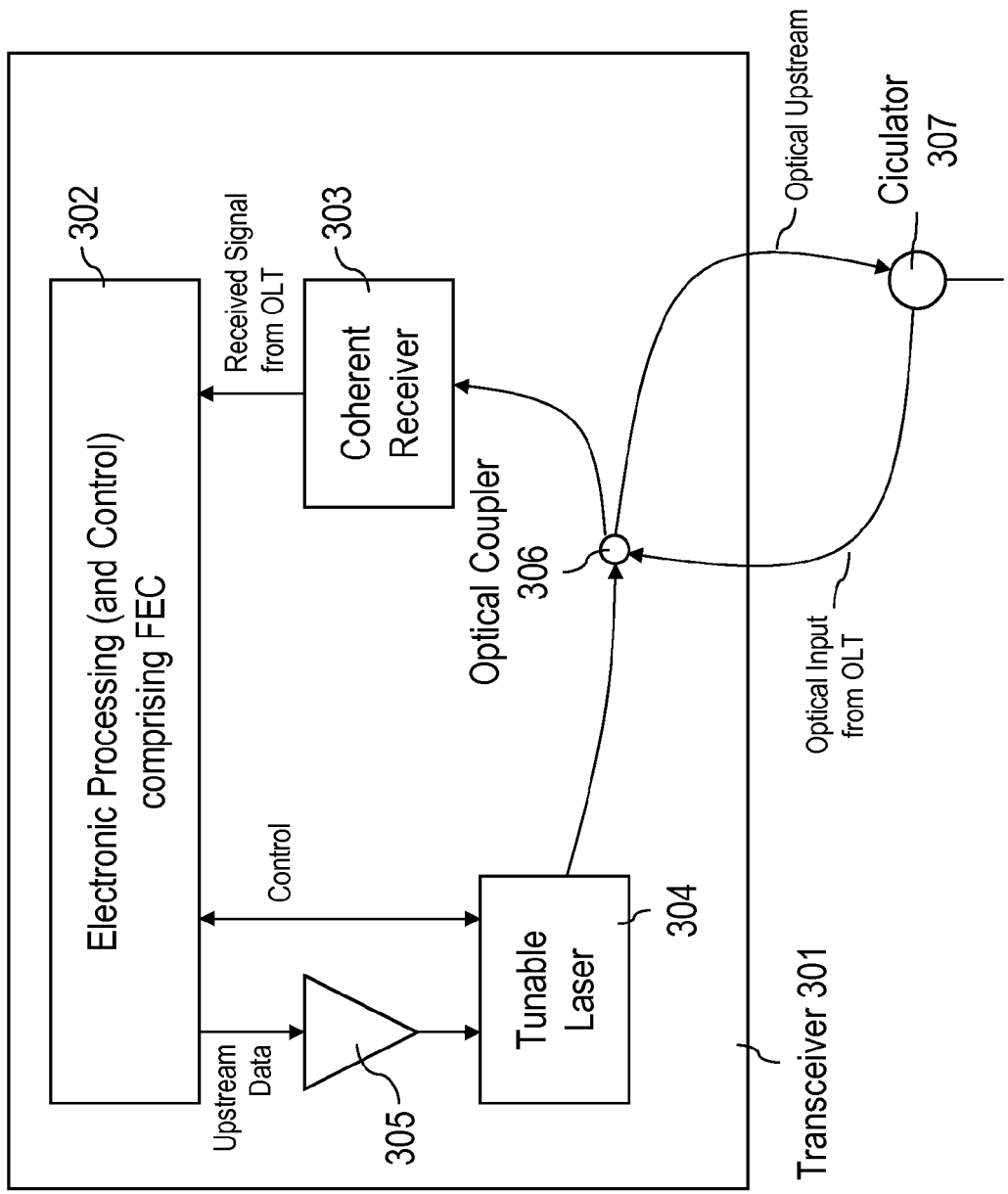
FIG. 3 shows a block diagram of a transceiver at the ONU, wherein a tunable laser provides a modulated optical data signal and an optical local oscillator signal.

FIG. 3 shows a transceiver 301 at the ONU comprising an optical coupler 306 receiving an optical input signal from the OLT and providing an optical upstream signal towards the OLT. An LO signal is provided by a tunable laser 304 to said coupler 306 and an output of the coupler 306 is also connected to a coherent receiver 303, which conveys the received signal from the OLT to a processing unit 302.

A circulator 307 combines a signal to be conveyed in upstream direction and a signal to be provided in downstream direction towards the optical coupler 306. The circulator 307 may further be optically connected to the OLT.

Said processing unit 302 comprises a control functionality as well as a forward error correction (FEC) functionality. The processing unit 302 compensates a distortion of or at the tunable laser 304 via a control signal used to calibrate the tunable laser 304.

Furthermore, upstream data are fed from the processing unit 302 via a driver 305 to the tunable laser 304.

The tunable laser 304 (e.g., in combination with a SOA or driver 305) can be used for modulating the upstream data and transmitting such data towards the OLT and it can be used to provide the optical local oscillator signal. Advantageously, no separate modulator is required.

A distortion of the received down-stream signal that stems from the modulation of the tunable laser 304 is known and can be electronically reduced and/or compensated. The FEC functionality together with the compensation signal allows detecting indirectly (e.g., by assessing a number of errors corrected by the FEC functionality and/or a bit error rate) if the phase and/or the frequency shift for the upstream signal is correct. This can be used to adjust the signal driving the tunable laser 304. A bit error rate or the number of corrected bits at the receiver 303 is thus minimized if the correction signal for an optimum upstream transmitter phase or frequency shift is used and if a driving current for the laser modulation meets this requirement.

It is noted that in case of utilizing a DML, a lower cut-off frequency of the data signal may advantageously be in the order of 1 MHz to ensure that only carrier density effects are responsible for the frequency excursion of the laser as a function of the driving current and not of the laser's change in temperature. This, however, does not matter in case the LO light source is a combination of a tunable laser diode and a SOA, wherein the SOA has to be modulated, preferable by utilizing a differential phase modulation.

Hence, a DML at the ONU can be used as optical local oscillator carrying the modulated optical signal to be conveyed to its destination (e.g., to the OLT).

The coherent receiver 303 obtains the received optical signal together with the optically modulated optical data signal (both are mixed by the optical coupler 306). This modulated optical data signal provided by the tunable laser 304 can be electronically compensated by applying the inverse modulated optical data signal to the received signal from the OLT.

In addition, the FEC at the processing unit 302 can be used to indicate a number of errors corrected by the FEC function. The tunable laser 304 is thus (continuously or iteratively), e.g., adjusted by modifying its gain or by adjusting a phase modulation index, to reduce the number of corrected errors at the processing unit 302. If a minimum number of corrected errors is reached, the tunable laser 304 may have reached an optimum value.

Also, a special wavelength plan with a channel spacing amounting to $3\Delta f$ around the OLT's LO frequency can be processed thereby allowing heterodyne detection over a single fiber UDWDM system.

The transceiver as described or shown in FIG. 3 can be deployed in a corresponding manner with the OLT.

Further Advantages:

The approach provided is cost effective, because there is no need for an external modulator. Instead, the laser can be used as optical LO and as transmitter due to the fact that its signal is directly being modulated either by modulating the laser or its amplifier.

The bandwidth requirements for electrical and optical transmitter components are significantly reduced at the ONU.

The transceiver at the ONU can be highly integrated.

Furthermore, an electrical and optical bandwidth utilization for a system with heterodyne detection and multichannel receivers at the OLT can be improved.

LIST OF ABBREVIATIONS

CWDM Coarse WDM
DML Directly Modulated Laser
DPSK Differential Phase Shift Keying
DQPSK Differential Quadrature Phase Shift Keying
FEC Forward Error Correction
FM Frequency Modulation
IF Intermediate Frequency
LO Local Oscillator
OAN Optical Access Network
OLT Optical Line Terminal
ONU Optical Network Unit
PD Photo Diode
PON Passive Optical Network
SOA Semiconductor Optical Amplifier
TDMA Time Division Multiple Access
TDM Time Division Multiplex
UDWDM Ultra Dense WDM
VCO Voltage Controlled Oscillator
WDM Wavelength Division Multiplex

The invention claimed is:

1. A transceiver, comprising:
a tunable laser unit adapted to receive a modulation signal representing data to be transmitted over a network and providing a modulated optical data signal to be transmitted;
a coherent optical receiver optically coupled to receive an optical input signal mixed with said modulated optical data signal, said modulated optical data signal acting as an optical local oscillator signal; and a processing unit receiving a signal output from said coherent optical receiver, said processing unit electronically compensating distortions caused by the modulation of the modulated optical data signal based on knowledge of the modulation signal.

2. The component according to claim 1, wherein said tunable laser unit has at least one of a directly modulated laser, or an optical amplifier, in combination with a tunable laser, wherein said optical amplifier is modulated.

3. The component according to claim 1, wherein said processing unit performs an error correction function and controls at least one parameter of said tunable laser unit based on information provided by said error correction function.

4. The component according to claim 1, wherein a channel spacing of a frequency amounting to 3Δf around a frequency Δf of the optical local oscillator signal is applied, wherein the frequency Δf corresponds to a frequency gap separating upstream and downstream signals or/and said frequency Δf corresponds to a frequency band used for a single channel.

5. The component according to claim 4, wherein the frequency Δf has a range of 0.1 GHz to 10 GHz.

6. The component according to claim 1, wherein the optical component is an optical network unit.

7. The component according to claim 1, wherein the optical component is an optical line terminal.

8. The component according to claim 2, wherein said optical amplifier is a semiconductor optical amplifier.

9. A method for data processing, which comprises the steps of:

providing, via a tunable laser, a modulated optical data signal to be transmitted;

receiving an optical signal;

combining the modulated optical data signal with the optical signal received resulting in a combined signal wherein the modulated optical signal is used as a local oscillator; and at least partially electronically compensating the modulated optical data signal.

10. The method according to claim 9, which further comprises controlling the tunable laser based on an error rate and/or on a number of corrected errors determined in the combined signal containing the modulated optical data signal and the received optical signal.

11. The method according to claim 10, which further comprises determining the error rate and the number of corrected errors by use of a forward error correction function.

12. The method according to claim 9, which further comprises running the method on an optical component.

13. The method according to claim 12, which further comprises selecting the optical component from the group consisting of a transceiver for an optical line terminal and an optical network unit.

* * * * *